US012655796B1

(12) United States Patent
Remy et al.

(10) Patent No.: US 12,655,796 B1
(45) Date of Patent: Jun. 16, 2026

(54) IMPELLER BACKFACE COOLED P3 PASSAGE THROUGH DIFFUSER/REDUCING HIGH TEMP EXPOSURE OF COOLED AIR

(71) Applicant: PRATT & WHITNEY CANADA CORP., Longueuil (CA)

(72) Inventors: Patrice Remy, St. Hubert (CA); Ian MacFarlane, St-Bruno (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/330,459

(22) Filed: Sep. 16, 2025

(51) Int. Cl.
| | |
|---|---|
| *F02C 7/12* | (2006.01) |
| *F02C 3/08* | (2006.01) |
| *F02C 7/18* | (2006.01) |
| *F04D 29/44* | (2006.01) |
| *F04D 29/58* | (2006.01) |

(52) U.S. Cl.
CPC ................. *F02C 7/12* (2013.01); *F02C 3/08* (2013.01); *F02C 7/185* (2013.01); *F04D 29/441* (2013.01); *F04D 29/5846* (2013.01); *F05D 2240/12* (2013.01); *F05D 2260/20* (2013.01)

(58) Field of Classification Search
CPC .. F02C 3/08; F02C 3/085; F02C 3/089; F02C 7/12; F02C 7/14; F02C 7/141; F02C 7/143; F02C 7/16; F02C 7/18; F02C 7/185; F04D 29/441; F04D 29/444; F04D 29/5826; F04D 29/584; F04D 29/5846
See application file for complete search history.

(56) References Cited

U.S. PATENT DOCUMENTS

| | | | |
|---|---|---|---|
| 4,923,370 | A | 5/1990 | Larson et al. |
| 6,190,123 | B1 | 2/2001 | Wunderwald et al. |
| 6,257,834 | B1 | 7/2001 | Bremer et al. |
| 6,276,896 | B1 | 8/2001 | Burge et al. |
| 8,137,075 | B2 * | 3/2012 | Howe ................. F04D 27/0246 416/185 |

* cited by examiner

*Primary Examiner* — Christopher R Legendre
(74) *Attorney, Agent, or Firm* — Kinney & Lange, P.A.

(57) ABSTRACT

A gas generator casing includes an inner annular wall extending radially inward from an outer annular wall. A diffuser is integrally formed with inner annular wall and forms diffuser passages extending radially outward diffuser pipes connected to tubes. A cooling tube assembly extends through the inner annular wall to form a cooling passage for providing back side cooling of a radial compressor.

18 Claims, 4 Drawing Sheets

IMPELLER BACKFACE COOLED P3 PASSAGE THROUGH DIFFUSER/REDUCING HIGH TEMP EXPOSURE OF COOLED AIR

BACKGROUND

The present disclosure relates to thermal management of gas turbine engine components and more particularly to thermal management of compressor impellers.

Gas turbine engine efficiency improves with decreasing thrust specific fuel consumption—the rate of fuel consumption per pound of thrust produced by the gas turbine engine. As thrust specific fuel consumption decreases, the overall pressure ratio of the gas turbine engine increases, which leads to increased compressor rotor speed and increased compressor temperature. The combination of increased primary stress and/or increased secondary stress within the compressor impeller decreases operational life of the compressor impeller, which can be counteracted with thermal management of the compressor impeller. However, to preserve efficiency gains, further development of the thermal management solution is desirable.

SUMMARY

In one aspect of this disclosure, a gas generator includes inner and outer annular walls that are concentric with respect to an axis. The inner annular wall extends radially inward from the outer annular wall to divide a combustor cavity from a compressor cavity. A diffuser formed by the inner annular wall includes an annular body, tubes, diffuser pipes, and diffuser passages. The annular body circumscribes the axis and is bound radially by an interior surface and an exterior surface. Each tube extends from the exterior surface to a distal end radially outward from the exterior surface. Each diffuser pipe joins with one of the tubes. Each diffuser passage extends from an inlet at the interior surface of the annular body through one of the tubes and one of the diffuser pipes to an outlet. The cooling tube assembly includes a first tube, a second tube, and a third tube. The first tube extends from a cooling inlet through the inner annular wall, and the second tube extends through the inner annular wall to a cooling outlet. The third tube joins the first tube to the second tube. The first tube and the second tube are joined with the inner annular wall. The first tube, the second tube, and the third tube form a cooling passage from the cooling inlet to the cooling outlet.

In another aspect of this disclosure, the cooling tube assembly can be one of multiple circumferentially cooling tube assembly, each cooling tube assembly forming a cooling passage that traverses the inner annular wall and having first, second, and third tubes.

In another aspect of this disclosure, the gas generator case, the diffuser, and the cooling tube assembly can be incorporated into a gas turbine engine. The gas turbine engine includes a combustor surrounded by the outer annular wall of the gas generator casing to form a combustor cavity, and the inner annular wall separates the combustor cavity from a compressor cavity. The diffuser axially coincides with a compressor impeller that is rationally coupled to a turbine by a shaft.

In another aspect of this disclosure, the gas turbine engine can include an extraction line fluidly connecting a port of the combustor cavity to a hot side port of a heat exchanger and a cooling supply line connecting a cold side port of the heat exchanger with the inlet of the cooling passage. The cooling supply line can be routed through the compressor cavity, which axially coincides with the compressor impeller.

DETAILED DESCRIPTION

As disclosed herein, a gas generator casing of a gas turbine engine has features for thermal management for the back side of a compressor impeller. A heat exchanger cools air extracted from a combustor cavity before the air passes through a cooling passage formed by a cooling tube assembly that traverses the diffuser. A cooling supply line connects the heat exchanger to the inlet of the cooling passage, which routes through at least one compressor cavity having a lower temperature and lower pressure relative to the combustor cavity. The cooling supply line route reduces temperature gains of the cooling fluid and thereby reduces the size and weight of the heat exchanger, extraction lines, and cooling fluid supply lines. The back side cooling and thermal management features enable the gas turbine engine to achieve higher overall pressure ratios while reducing efficiency losses due to excess weight of components and temperature gains of the cooling fluid.

Figure 1:
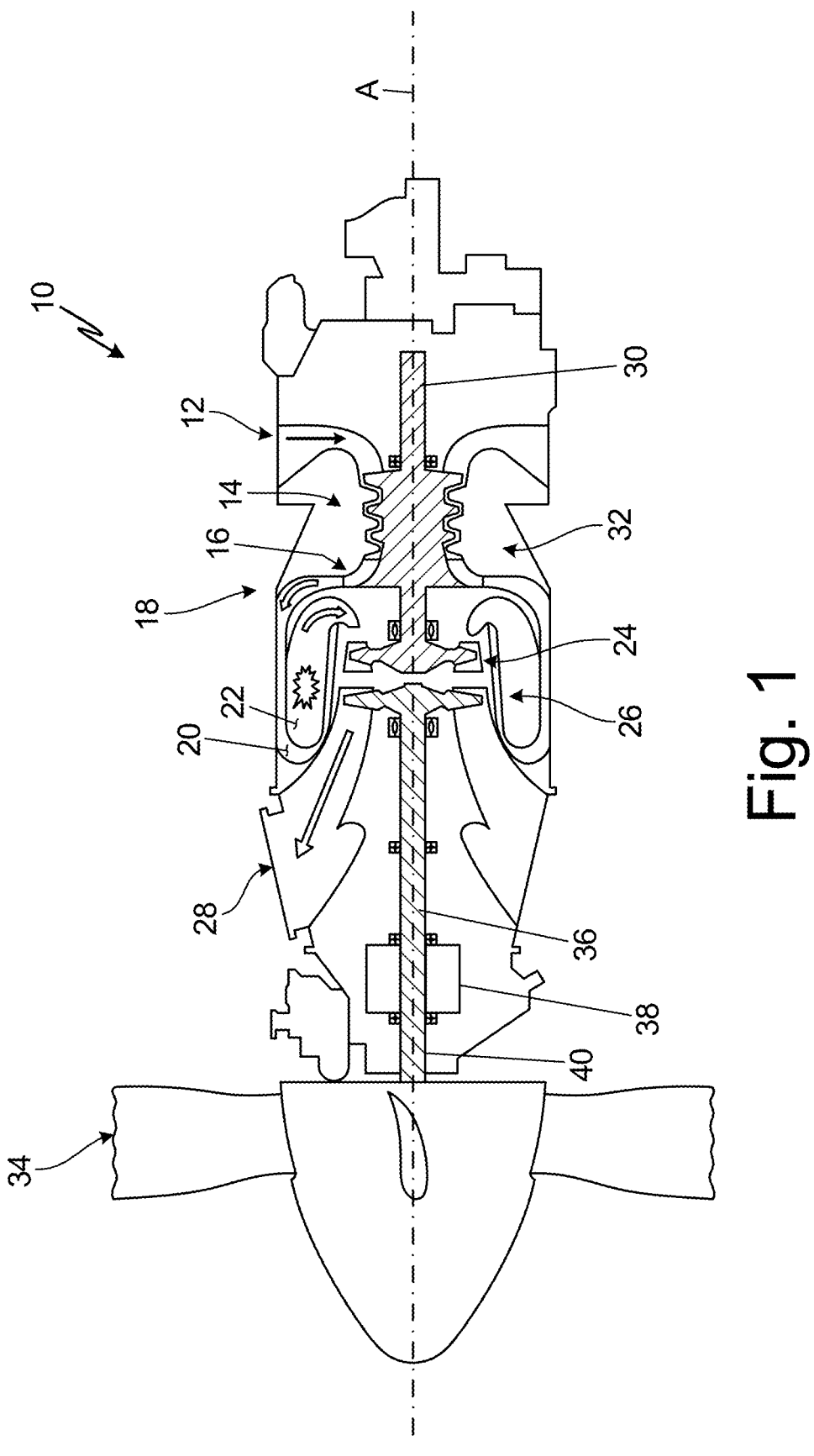
FIG. 1 is a cross-sectional view of an example gas turbine engine.

FIG. 1 is a cross-sectional view of gas turbine engine 10, which is configured as a turboprop engine. While the following discussion uses a turboprop engine as an example, the features described herein can be applied to a turboshaft engine, a turbofan engine, or other gas turbine engine having analogous features.

As depicted, gas turbine engine 10 includes, in flow-series, air inlet 12, axial compressor 14, compressor impeller 16, diffuser 18, combustor cavity 20, combustor 22, compressor turbine 24, power turbine 26, and exhaust 28. Air inlet 12 is depicted as a radial inlet duct that can include one or more sets of fixed and/or variable inlet guide vanes in certain examples. Axial compressor 14, compressor impeller 16, and compressor turbine 24 are rotationally coupled by shaft 30 to form gas generator 32, which rotates about axis A. Power turbine 26 rotationally couples to propeller 34 via power turbine shaft 36, reduction gear box 38, and propeller shaft 40. Power turbine shaft 36 and propeller shaft 40 are depicted coaxial with shaft 30 of gas generator 32 as an example. Other versions of gas turbine engine 10 can include power turbine shaft 36 laterally offset from propeller 34 and propeller shaft 40 by reduction gear box 38.

Gas turbine engine 10 is depicted by FIG. 1 with a tractor configuration in which propeller 34 is forward of power turbine 26 and gas generator 32. Propeller 34 pulls gas turbine engine 10 and the associated aircraft through the air stream in the tractor configuration. In other examples, gas turbine engine 10 can have a pusher configuration in which propeller 34 is aft of power turbine 26 and gas generator 32.

Propeller 34 pushes gas turbine engine 10 and the associated aircraft forward through the air stream in the pusher configuration.

Gas turbine engine 10, as depicted, has reverse-flow architecture in which gas turbine engine 10 ingests air at an aft air inlet 12 that flows forward through gas generator 32 and power turbine 26 to a forward exhaust 28. In other examples, gas turbine engine 10 can have a forward-to-aft architecture in which air inlet 12 is forward of exhaust 28 and air ingested through air inlet 12 flows aft through gas generator 32 and power turbine 26 to exit through exhaust 28.

Compressor impeller 16 of gas turbine engine 10 can include back side cooling to reduce the temperature of compressor impeller 16, which can support higher overall pressure ratios relative to an analogous gas turbine engine 10 without back side cooling.

Figure 2:
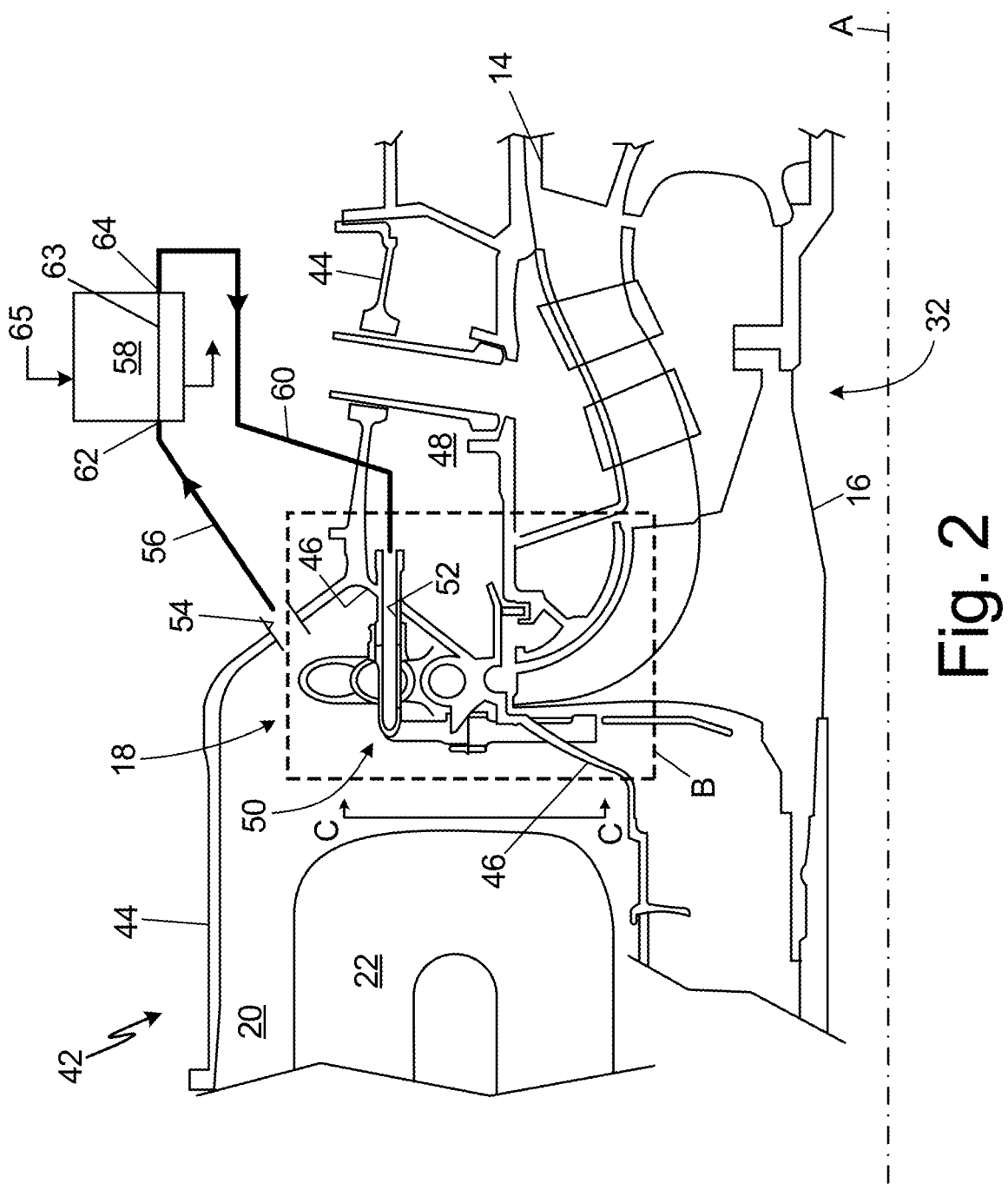
FIG. 2 is a partial cross-sectional view of an example gas generator of the gas turbine engine depicting a diffuser with a cooling passage provided with fluid from a combustor cavity.

FIG. 2 is a schematic cross-sectional view of gas generator 32 in which compressor impeller 16 is configured with back side cooling. Axial compressor 14, diffuser 18, combustor cavity 20, and combustor 22 are also shown.

Figure 3:
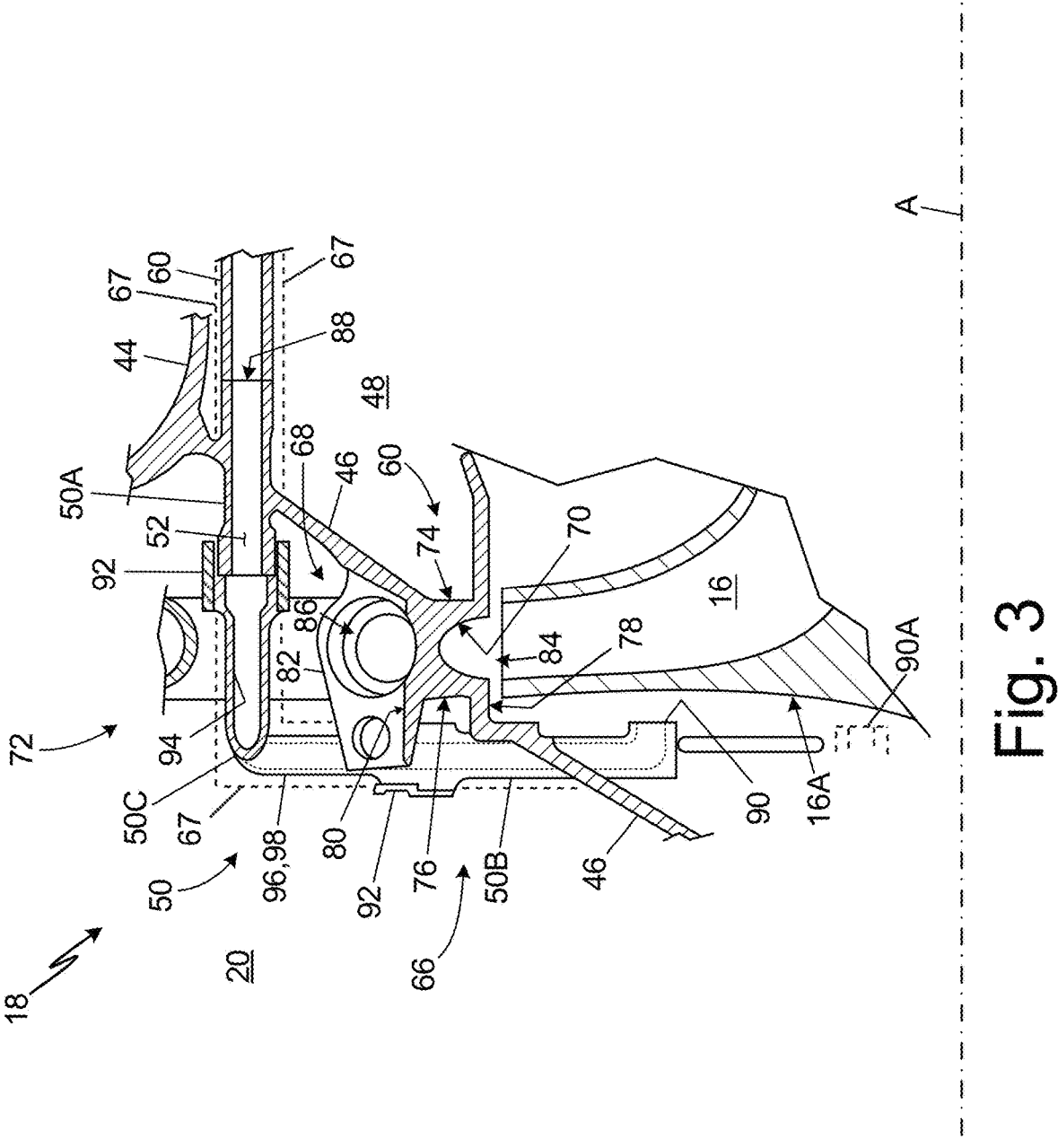
FIG. 3 is an enlarged view of the diffuser depicting additional features of the cooling passage.

Gas turbine engine 10 includes gas generator casing 42 radially spaced outward from and surrounding combustor 22 to form combustor cavity 20. Combustor cavity 20 is an annular plenum that is contiguous about axis A. Gas generator casing 42 includes outer annular wall 44 that extends axially along axis A to surround combustor 22, diffuser 18, compressor impeller 16, and at least portions of axial compressor 14. Inner annular wall 46 of gas generator casing 42 extends radially inward from outer annular wall 44 and, in some examples, forms an angle with axis A. In certain examples, inner annular wall 46 can be described as a conical or frustoconical wall. Inner annular wall 46 separates combustor cavity 20 from compressor cavity 48, which is radially outward from compressor impeller 16 and, in some examples, portions of axial compressor 14. In operation, compressor impeller 16 causes air within combustor cavity 20 to have higher pressure and higher temperature relative to air within compressor cavity 48, which is extracted from a location along axial compressor 14 or compressor impeller 16. Compressor cavity 48 can be a bleed air cavity containing bleed air extracted from axial compressor 14 and/or compressor impeller for example refer to as bleed air. As shown in FIG. 3, compressor cavity 48 can be described as a P2.8 bleed air cavity.

Diffuser 18 is formed by inner annular wall 46 and is radially outward from an outlet of compressor impeller 16. In operation, diffuser 18 receives flow discharged from compressor impeller 16 and redirects the flow from a radially outward swirl flow to an axial flow within combustor cavity 20. The geometry of diffuser passages can include increasing cross-sectional area normal to the flow direction, which provides static pressure recovery of the compressor impeller discharge flow prior to combustor cavity 20. Gas generator casing 42 includes cooling tube assembly 50 that extends through inner annular wall 46 to form cooling passage 52.

Gas turbine engine 10 further includes combustor cavity port 54, extraction line 56, heat exchanger 58, and cooling supply line 60. Port 54 extends through outer annular wall 44 within combustor cavity 20 to extract air into extraction line 56. Air extracted from combustor cavity 20 can be referred to as P3.0 bleed air in certain examples. Extraction line 56 routes combustor cavity air to hot side port 62 of heat exchanger 58, which includes air path 63 from hot side port 62 through heat exchanger 58 to cold side port 64. Air path 63 is placed in a heat exchange relationship with working fluid path 65. Working fluid path 65 can be fluid from an ancillary system of gas turbine engine 10 such as, for example, a lubrication system. The heat exchanger 58 and temperature differential between the air path 63 and working fluid path 65 are configured to cool air extracted from combustor cavity 20. That is to say, the temperature of fluid within working fluid path 65 is less than an air temperature within air path 63. Cooling supply line 60 fluidly connects cold side port 64 to an inlet of cooling passage 52. Cooling supply line 58, or portions thereof, can be surrounded by thermal insulation or a heat shield to further reduce temperature gains of air delivered to cooling passage 50 as discussed below.

Figure 4:
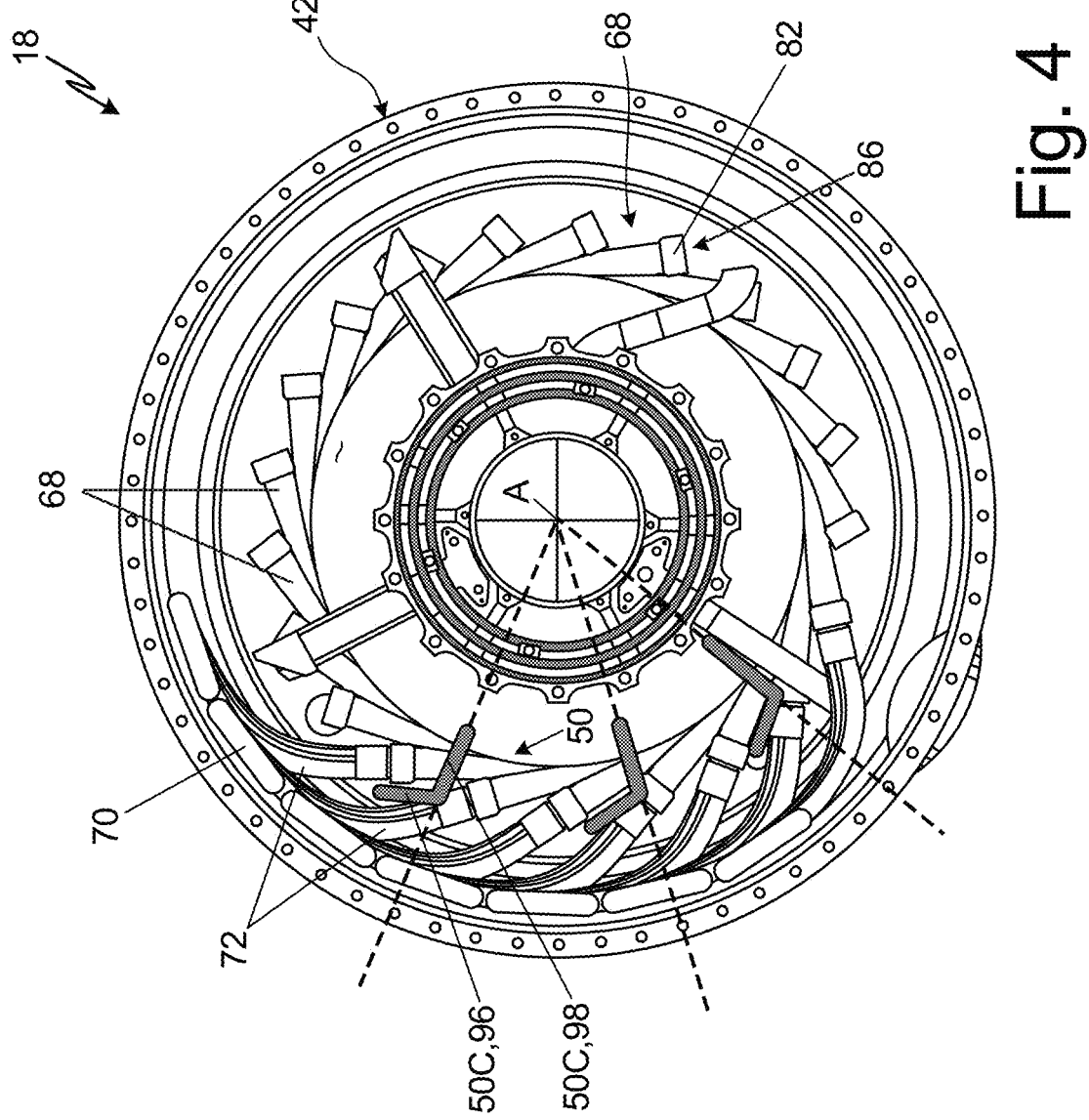
FIG. 4 is an end view of diffuser taken along line C-C depicting additional features of the diffuser and cooling passage.

FIG. 3 is an enlarged view of region B in FIG. 2. FIG. 4 is an end view of diffuser 18 taken along line C-C, FIG. 3 and FIG. 4 depict additional details of diffuser 18, cooling tube assembly 50, and cooling passage 52 and are discussed together below.

Diffuser 18 includes annular body 66, tubes 68, diffuser passages 70, and diffuser pipes 72. Annular body 66 surrounds axis A radially outward from compressor impeller 16 and is integrally formed with inner annular wall 46 by, for example, a welding process or a machining process. Annular body 66 axially coincides with an outlet of compressor impeller 16. End surfaces 74, 76 are axial boundaries of annular body 66, and interior surface 78 and exterior surface 80 radially bound annular body 66. First end face 74 forms an axial boundary between annular body 66 and compressor cavity 48. Interior surface 78 and exterior surface 80 extend axially from first end surface 74 to form radially inner and radially outer boundaries respectively. Second end face 76 forms an axial boundary between annular body 66 and combustor cavity 20 and forms an opposite end of annular body 66 relative to first end surface 74.

Tubes 68 are extensions that are circumferentially spaced equally about axis A as shown in FIG. 4. Tubes 68 extend from exterior surface 80 of annular body 66 to respective distal ends 82, which can include a flange or other mechanical features to facilitate connection with diffuser pipes 72. Diffuser passages 70 extend radially through diffuser 18 from inlets 84 at interior surface 78 through annular body 66 and tubes 68 to outlets 86 at distal ends 82. When diffuser pipes 72 are attached, diffuser passages 70 additionally extend through respective diffuser pipes 72. Each diffuser passage 70 forms a discrete passage through diffuser 18 that does not communicate with any other passage of diffuser 18.

Diffuser pipes 72 are connected to distal ends of respective tubes 68. A radial portion of diffuser pipes 72 extends radially outward from tubes 68 and, in some examples, extends circumferentially about axis A. An axial portion contiguous with the radial portion transitions from a radial direction to extend axially into combustor cavity 20. The cross-section of each diffuser pipe 72 can transition from a circular profile at tubes 68 to an oblong profile that flattens reach diffuser pipe 72 along a circumferential direction of combustor cavity 20 to promote even distribution of flow within combustor cavity 20. Further, the cross-sectional area of each diffuser passage 70 normal to the flow direction within can increase in a direction from respective inlets 84 towards outlets 86 and/or distal ends of diffuser pipes 72.

Cooling tube assembly 50 forms a cooling passage 52 that traverses inner annular wall 46 of gas generator casing 42. Cooling tube assembly 50 includes first tube 50A, second tube 50B, and third tube 50C. First tube 50A and second tube 50B extend through and are joined with inner annular wall 46 by, for example, a welding process or a brazing process, among other potential joining processes. First tube 50A extends from cooling inlet 88 through inner annular wall 46 and is disposed radially outward from annular body 66 and tubes 68. First tube 50A is circumferentially positioned to extend axially between two circumferentially adjacent diffuser pipes 72 as shown, for example, in FIG. 4. In some examples, first tube 50A extends axially through inner annular wall 46. Second tube 50B extends through inner annular wall 46 at a location that positions annular body 66 of diffuser 18 axially between first tube 50A and second tube 50B. Second tube 50B extends to cooling outlet 90 that is radially inward of interior surface 78 of annular body 66. In some examples, second tube 50B can extend radially through inner annular wall 46. Third tube 50C extends between ends of first tube 50A and second tube 50B and is located within combustor cavity 20. Cooling passage 52 extends through first tube 50A, second tube 50B, and third tube 50C to form a contiguous cooling path from cooling inlet 88 to cooling outlet 90.

The orientation of cooling outlet 90 can have axial, radial, and/or circumferential components to direct cooling fluid onto the back side of compressor impeller 16 at a desired impingement angle with respect to the back side surface of compressor impeller 16, or at a desired angle with respective to axis A and two mutually orthogonal directions. As shown in FIG. 3, cooling outlet 90 has an axial orientation to direct cooling fluid axially onto back side surface 16A of compressor impeller 16.

First tube 50A, second tube 50B, and third tube 50C are joined by any suitable process such as a welding process and/or a brazing process, among other potential processes. As depicted, cooling tube assembly 50 includes ferrules 92 located at the interface between first tube 50A and third tube 50C, and at the interface between second tube 50B and third tube 50C. Ferrules 92 register with ends of each of first tube 50A, second tube 50B, and third tube 50C to maintain a gap between ferrules 92 and tubes 50A, 50B, and 50C, which is filled by brazing during a joining process. Interfacing ends of tubes 50A, 50B, and 50C can include a pilot diameter and corresponding bore that create a location fit or an interference fit to further facilitate assembly of cooling tube assembly 50.

In some examples, third tube 50C can extend radially and/or circumferentially to circumferentially offset cooling outlet 90 relative to cooling inlet 88, which may be necessary to integrate cooling tube assembly 50 with gas generator casing 42, diffuser 18, and diffuser pipes 72. For example, third tube 50C can include first segment 94 that extends axially parallel to first tube 50A to clear diffuser pipes 72 and annular body 66 as shown in FIG. 3. Further, second segment 96 of the third tube 50C can extend radially inward and circumferentially about axis A from first segment 94, and third segment 98 of third tube 50C can extend radially inward from second segment 96 to second tube 50B as shown in FIG. 4.

While FIG. 3 depicts a single cooling tube assembly 50, gas generator casing 42 can include multiple cooling tube assemblies 50 circumferentially spaced about axis A as shown in FIG. 4. Each cooling tube assembly 50 can include first tube 50A, second tube 50B, and third tube 50C as described above. Cooling tube assemblies 50 can be equally spaced or unequally spaced in a circumferential direction to address back side cooling requirements of compressor impeller 16. In some examples, one or more cooling outlets 90 can be located at different radial locations with respect to axis A in order to provide back side cooling of different radial regions of compressor impeller 16 as represented by dashed line 90A in FIG. 3, which is depicted radially inward from outlet 90.

Cooling supply line 60 and/or cooling tube assembly 50 can include thermal insulation 67 as shown in FIG. 3 and represented by dashed line. Thermal insulation 67 surrounds the entire length of cooling supply line 60 and/or cooling tube assembly 50 in some examples, while surrounding one or more portions of cooling supply line 58 in other examples. Thermal insulation 67 can be any thermally insulating material suitable for use in compressor cavity 48, combustor cavity 20, or other regions of gas turbine engine 10. In other examples, thermal insulation 67 can be a heat shield that surrounds cooling supply line 60 and/or cooling tube assembly 50, or portions thereof, to form an air gap, which acts as a thermal insulator. Thermal insulation 67 further reduces temperature gains into the cooling fluid (e.g., cooled air from combustor cavity 20).

In operation, compressed air within combustor cavity 20 (i.e., P3.0 air) diverts through combustor cavity port 54 into extraction line 56. The air is cooled by heat exchanger 58 before discharging into cooling supply line 60, which is joined with cooling inlet 88 of cooling tube assembly 50. Cooling supply line 60 routes through compressor cavity 48, which may contain air at lower temperature and lower pressure relative to combustor cavity 20. Heat exchanger 58 is mounted to gas turbine engine 10 and may mount proximate to gas generator casing 42 such that lengths of extraction line 56 and cooling supply line 60 are minimized. Heat exchanger 58 can axially coincide with axial compressor 14 or air inlet 12 in other examples. In such examples, cooling supply line 60 can pass through one or more other compressor cavities associated with axial compressor 14 prior to extending through compressor cavity 48 to join with cooling inlet 88.

The following are non-exclusive descriptions of possible embodiments of the present invention.

A Gas Generator Casing Having a Diffuser and Cooling Tube Assembly Configured to Provide Back Side Cooling to a Radial Compressor A gas generator casing according to an example embodiment of this disclosure includes, among other things, an outer annular wall, an inner annular wall, a diffuser, and a cooling tube assembly. The inner annular wall extends radially inward from the outer annular wall, each of the inner annular wall and the outer annular wall are concentric with an axis. The diffuser formed by the inner annular wall. The diffuser includes an annular body, a plurality of tubes, a plurality of diffuser pipes, and a plurality of diffuser passages. The annular body circumscribes the axis and is bound radially by an interior surface and an exterior surface. Each tube extends from the exterior surface to a distal end radially outward from the exterior surface. Each diffuser pipe joins with a different tube. The diffuser passages extend from an inlet at the interior surface of the annular body through one of the tubes and one of the diffuser pipes to an outlet. The cooling tube assembly includes a first tube, a second tube, and a third tube. The first tube extends from a cooling inlet through the inner annular wall. The second tube extends through the inner annular wall to a cooling outlet. The third tube joins with the first tube and the second tube. The first tube and the second tube are joined with the inner wall. The first tube, the second tube, and the third tube form a cooling passage from the cooling inlet to the cooling outlet. The cooling outlet extends along a direction that is oblique to a longitudinal direction of the second tube.

The gas generator casing of the preceding paragraph can optionally include, additionally and/or alternatively, any one or more of the following features, configurations and/or additional components.

A further embodiment of the foregoing gas generator casing, wherein the first tube can extend between two circumferentially adjacent diffuser pipes.

A further embodiment of any of the foregoing gas generator casings, wherein the first tube can extend axially through the inner annular wall.

A further embodiment of any of the foregoing gas generator casings, wherein the second tube can extend radially through the inner annular wall.

A further embodiment of any of the foregoing gas generator casings, wherein the second tube can extend radially inward of the interior surface of the diffuser.

A further embodiment of any of the foregoing gas generator casings, wherein the second tube can be circumferentially offset from the first tube.

A further embodiment of any of the foregoing gas generator casings, wherein the third tube can include a first segment that extends axially parallel to the first tube, a second segment that extends radially and circumferentially with respect to the axis, and a third segment that extends radially with respect to the axis to join with the second tube.

A further embodiment of any of the foregoing gas generator casings, wherein the cooling tube assembly can be a first cooling tube assembly of a plurality of cooling tube assemblies that are circumferentially spaced about the axis.

A further embodiment of any of the foregoing gas generator casings, wherein a second cooling tube assembly of the plurality of cooling tube assemblies can include a second outlet that is radially inward from the outlet of the first cooling tube assembly.

A Gas Turbine Engine that Includes a Generator Case Configured with Cooling Tube Assembly Configured for Back Side Cooling of a Radial Compressor A gas turbine engine according to an example embodiment of this disclosure includes, among other things, a combustor, a compressor impeller, a turbine, a shaft, and a gas generator case. The compressor impeller is rotationally coupled to the turbine by the shaft. The gas generator casing includes an outer annular wall, an inner annular wall, a diffuser, and a cooling tube assembly. The inner annular wall extends radially inward from the outer annular wall, each of the inner annular wall and the outer annular wall are concentric with an axis. The diffuser formed integrally with the inner annular wall. The diffuser includes an annular body, a plurality of tubes, a plurality of diffuser pipes, and a plurality of diffuser passages. The annular body circumscribes the axis and is bound radially by an interior surface and an exterior surface. Each tube extends from the exterior surface to a distal end radially outward from the exterior surface. Each diffuser pipe joins with a different tube. The diffuser passages extend from an inlet at the interior surface of the annular body through one of the tubes and one of the diffuser pipes to an outlet. The cooling tube assembly includes a first tube, a second tube, and a third tube. The first tube extends from a cooling inlet through the inner annular wall. The second tube extends through the inner annular wall to a cooling outlet. The third tube joins with the first tube and the second tube. The first tube and the second tube are joined with the inner wall. The first tube, the second tube, and the third tube form a cooling passage from the cooling inlet to the cooling outlet. The cooling outlet extends along a direction that is oblique to a longitudinal direction of the second tube.

The gas turbine engine of the preceding paragraph can optionally include, additionally and/or alternatively, any one or more of the following features, configurations and/or additional components.

A further embodiment of the foregoing gas turbine engine can further include a port extending through the outer annular wall.

A further embodiment of any of the foregoing gas turbine engines can further include a heat exchanger having an air path extending from a hot side port to a cold side port placed in a heat exchange relationship with a working fluid path.

A further embodiment of any of the foregoing gas turbine engines can further include an extraction line fluidly connecting the port to the hot side port of the heat exchanger.

A further embodiment of any of the foregoing gas turbine engines can further include a cooling line fluidly connecting the cold side port to the inlet of the first segment of the cooling passage.

A further embodiment of any of the foregoing gas turbine engines, wherein the cooling line can extend through the outer annular wall into the compressor cavity to join with the cooling inlet of the cooling passage.

A further embodiment of the foregoing gas turbine engines, wherein the first tube can extend between two circumferentially adjacent diffuser pipes.

A further embodiment of any of the foregoing gas turbine engines, wherein the first tube can extend axially through the inner annular wall.

A further embodiment of any of the foregoing gas turbine engines, wherein the second tube can extend radially through the inner annular wall.

A further embodiment of any of the foregoing gas turbine engines, wherein the second tube can extend radially inward of the interior surface of the diffuser.

A further embodiment of any of the foregoing gas turbine engines, wherein the second tube can be circumferentially offset from the first tube.

A further embodiment of any of the foregoing gas turbine engines, wherein the third tube can include a first segment that extends axially parallel to the first tube, a second segment that extends radially and circumferentially with respect to the axis, and a third segment that extends radially with respect to the axis to join with the second tube.

A further embodiment of any of the foregoing gas turbine engines, wherein the cooling tube assembly can be a first cooling tube assembly of a plurality of cooling tube assemblies that are circumferentially spaced about the axis.

A further embodiment of any of the foregoing gas turbine engines, wherein a second cooling tube assembly of the plurality of cooling tube assemblies can include a second outlet that is radially inward from the outlet of the first cooling tube assembly.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas generator casing comprising:

an outer annular wall;

an inner annular wall extending radially inward from the outer annular wall, wherein the inner annular wall and the outer annular wall are concentric with respect to an axis; and a diffuser integrally formed with the inner annular wall, the diffuser comprising:

a plurality of tubes, each tube extending from an exterior surface of the diffuser to a distal end radially outward from the exterior surface;

a plurality of diffuser pipes, each diffuser pipe joins with a different tube of the plurality of tubes and includes a first portion that extends in a radial direction and a second portion extending in an axial direction; and a plurality of diffuser passages, each diffuser passage extending from an inlet at an interior surface of the diffuser through one of the tubes and one of the diffuser pipes to an outlet at the distal end of the diffuser pipe; and a cooling tube assembly comprising:

a first tube extending from a cooling inlet through the inner annular wall;

a second tube extending through the inner annular wall to a cooling outlet; and a third tube joined with the first tube and the second tube, wherein the first tube and the second tube are joined with the inner annular wall, and wherein the first tube, the second tube, and the third tube define a cooling passage from the cooling inlet to the cooling outlet, and wherein the cooling outlet extends along a direction that is oblique to a longitudinal direction of the second tube.

2. The gas generator casing of claim 1, wherein the first tube extends between two circumferentially adjacent said diffuser pipes.

3. The gas generator casing of claim 2, wherein the first tube extends axially through the inner annular wall.

4. The gas generator casing of claim 3, wherein the second tube extends radially through the inner annular wall.

5. The gas generator casing of claim 4, wherein the second tube extends radially inward of the interior surface of the diffuser.

6. The gas generator casing of claim 1, wherein the second tube is circumferentially offset from the first tube.

7. The gas generator casing of claim 6, wherein the third tube includes a first segment that extends axially parallel to the first tube, a second segment that extends radially and circumferentially with respect to the axis, and a third segment that extends radially with respect to the axis to join with the second tube.

8. The gas generator casing of claim 1, wherein the cooling tube assembly is a first cooling tube assembly of a plurality of cooling tube assemblies that are circumferentially spaced about the axis.

9. The gas generator casing of claim 8, wherein a second cooling tube assembly of the plurality of cooling tube assemblies includes a second outlet that is radially inward from the outlet of the first cooling tube assembly.

10. A gas turbine engine comprising:

a combustor;

a compressor impeller rotational coupled to a turbine by a shaft;

a gas generator case comprising:

an outer annular wall surrounding the combustor to form a combustor cavity and surrounding the compressor impeller to form a bleed air cavity;

an inner annular wall extending radially inward from the outer annular wall to separate the combustor cavity from the bleed air cavity, wherein the inner annular wall and the outer annular wall are concentric with respect to an axis; and a diffuser integrally formed with the inner annular wall, the diffuser comprising:

a plurality of tubes, each tube extending from an exterior surface of the diffuser to a distal end radially outward from the exterior surface;

a plurality of diffuser pipes, each diffuser pipe joins with a different tube of the plurality of tubes and includes a first portion that extends in a radial direction and a second portion extending in an axial direction; and a plurality of diffuser passages, each diffuser passage extending from an inlet at an interior surface of the diffuser through one of the tubes and one of the diffuser pipes to an outlet at the distal end of the diffuser pipe; and a cooling tube assembly comprising:

a first tube extending from a cooling inlet through the inner annular wall;

a second tube extending through the inner annular wall to a cooling outlet; and a third tube joined with the first tube and the second tube, wherein the first tube and the second tube are joined with the inner annular wall, and wherein the first tube, the second tube, and the third tube define a cooling passage from the cooling inlet to the cooling outlet, and wherein the cooling outlet extends along a direction that is oblique to a longitudinal direction of the second tube and fluidly communicates with a back side surface of the compressor impeller.

11. The gas turbine engine of claim 10, further comprising:

a bleed port extending through the outer annular wall;

a heat exchanger having a bleed air path extending from a hot side port to a cold side port placed in a heat exchanger relationship with a working fluid path;

an extraction line fluidly connecting the bleed port to the hot side port of the heat exchanger; and a cooling line fluidly connecting the cold side port to the inlet of the cooling passage.

12. The gas turbine engine of claim 10, wherein the cooling line extends through the outer annular wall into the bleed air cavity to join with the inlet of the cooling passage.

13. The gas turbine engine of claim 10, wherein the first tube extends between two circumferentially adjacent said diffuser pipes.

14. The gas turbine engine of claim 10, wherein the second tube extends radially inward of the interior surface of the diffuser.

15. The gas turbine engine of claim 10, wherein the second tube is circumferentially offset from the first tube.

16. The gas turbine engine of claim 15, wherein the third tube includes a first segment that extends axially parallel to the first tube, a second segment that extends radially and circumferentially with respect to the axis, and a third segment that extends radially with respect to the axis to join with the second tube.

17. The gas turbine engine of claim 10, wherein the cooling tube assembly is a first cooling tube assembly of a plurality of cooling tube assemblies that are circumferentially spaced about the axis.

18. The gas turbine engine of claim 17, wherein a second cooling tube assembly of the plurality of cooling tube assemblies includes a second outlet that is radially inward from the outlet of the first cooling tube assembly.

* * * * *